US011836360B2

(12) United States Patent
Narayanam et al.

(10) Patent No.: US 11,836,360 B2
(45) Date of Patent: Dec. 5, 2023

(54) GENERATING MULTI-DIMENSIONAL HOST-SPECIFIC STORAGE TIERING

(71) Applicant: International Business Machines Corporation, Armonk, NY (US)

(72) Inventors: Krishnasuri Narayanam, Bangalore (IN); Sarvesh S. Patel, Pune (IN); Kushal S. Patel, Pune (IN); Amith Singhee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 17/545,402

(22) Filed: Dec. 8, 2021

(65) Prior Publication Data

US 2023/0176755 A1    Jun. 8, 2023

(51) Int. Cl.
*G06F 12/00*    (2006.01)
*G06F 3/06*    (2006.01)

(52) U.S. Cl.
CPC .......... *G06F 3/0631* (2013.01); *G06F 3/0604* (2013.01); *G06F 3/067* (2013.01); *G06F 3/0644* (2013.01)

(58) Field of Classification Search
CPC .... G06F 3/0631; G06F 3/0604; G06F 3/0644; G06F 3/067
See application file for complete search history.

(56) References Cited

U.S. PATENT DOCUMENTS

| | | | |
|---|---|---|---|
| 7,596,587 B2 | 9/2009 | Berkhin et al. | |
| 7,640,470 B2 | 12/2009 | Lammel et al. | |
| 8,627,035 B2 | 1/2014 | Ambat et al. | |
| 8,838,887 B1 | 9/2014 | Burke et al. | |
| 8,886,901 B1 | 11/2014 | Hsu et al. | |
| 8,996,808 B2 | 3/2015 | Hyde, II et al. | |

(Continued)

FOREIGN PATENT DOCUMENTS

| CN | 107621927 A | 1/2018 |
|---|---|---|
| CN | 108205573 A | 6/2018 |

(Continued)

OTHER PUBLICATIONS

International Search Report and Written Opinion from International Application No. PCT/CN2022/130636, 9 pages, dated Jan. 28, 2023.

(Continued)

*Primary Examiner* — John A Lane
(74) *Attorney, Agent, or Firm* — Ryan, Mason & Lewis, LLP

(57) ABSTRACT

Methods, systems, and computer program products for generating multi-dimensional host specific storage tiering are provided herein. A computer-implemented method includes maintaining information of a plurality of storage resources connected to at least one host device; configuring, based at least in part on the information, a plurality of partitions of the storage resources, each partition comprising multiple storage tiers, wherein the plurality of partitions is configured to provide physical migration paths between the multiple storage tiers within each of the partitions; detecting a change to the plurality of storage resources; and reconfiguring the plurality of partitions based at least in part on the detected change.

20 Claims, 12 Drawing Sheets

(56) References Cited

U.S. PATENT DOCUMENTS

| | | | |
|---|---|---|---|
| 9,116,914 | B1 | 8/2015 | Muthirisavenugopal et al. |
| 9,224,104 | B2 | 12/2015 | Lin et al. |
| 9,372,630 | B2 | 6/2016 | Guo et al. |
| 10,534,566 | B1 | 1/2020 | Bk et al. |
| 10,732,883 | B1 | 8/2020 | Narayanam et al. |
| 10,990,282 | B1 | 4/2021 | Lee et al. |
| 2012/0198152 | A1* | 8/2012 | Terry ............... G06F 11/1092 711/E12.001 |
| 2016/0019271 | A1 | 1/2016 | Ma et al. |
| 2016/0077966 | A1* | 3/2016 | Stabrawa ............ G06F 3/067 711/172 |
| 2017/0139629 | A1* | 5/2017 | Van Lunteren ....... G06F 3/0629 |
| 2018/0018379 | A1 | 1/2018 | Eda et al. |
| 2019/0155511 | A1 | 5/2019 | Tenner et al. |
| 2021/0034271 | A1 | 2/2021 | Qiang et al. |
| 2022/0107743 | A1* | 4/2022 | Yang .................. G06F 3/0685 |

FOREIGN PATENT DOCUMENTS

| | | |
|---|---|---|
| CN | 110268379 A | 9/2019 |
| EP | 3495944 A1 | 6/2019 |
| WO | 2007115426 A2 | 10/2007 |

OTHER PUBLICATIONS

"Smart Storage Migration Planning for the Hybrid Cloud", ip.com, available at https://priorart.ip.com/IPCOM/000261229, published Feb. 12, 2020.

"A method for auto storage tiering on cloud storage virtualization appliance", ip.com, available at https://priorart.ip.com/IPCOM/000260301, published Nov. 11, 2019.

Zhang, Gong, et al., "Adaptive data migration in multi-tiered storage based cloud environment." 2010 IEEE 3rd International Conference on Cloud Computing. IEEE, Jul. 5, 2010.

"Storage tiering based on performance and cost constraints", ip.com, available at https://priorart.ip.com/IPCOM/000253119, published Mar. 6, 2018.

Mell, Peter, et al., The NIST Definition of Cloud Computing, National Institute of Standards and Technology, U.S. Department of Commerce, NIST Special Publication 800-145, Sep. 2011.

Long, Peter, "Dell Compellent SNMP Overview", Dell Engineering, available at https://www.delltechnologies.com/asset/en-us/products/storage/industry-market/dell-compellent-snmp-overview.pdf (last accessed Dec. 8, 2021), published Jul. 2014.

"The Architectural Advantages of Dell SC Series Automated Tiered Storage, Dell Engineering", available at https://www.delltechnologies.com/asset/en-us/products/storage/industry-market/dell-compellent-snmp-overview.pdf (last accessed Dec. 8, 2021), published Jan. 2016.

"Data Progression | DataSheet", Compellent Technologies, available at https://www.sanstorageworks.com/datasheets/Compellent/Compellent-DataProg-DS.pdf, last accessed Dec. 8, 2021.

Dell EMC Unity: FAST Technology Overview, Dell Technologies, available at https://www.delltechnologies.com/asset/en-us/products/storage/industry-market/h15086-emc-unity-fast-technology-overview.pdf (last accessed Dec. 8, 2021), Feb. 2021.

"HP 3PAR Adaptive Optimization Software", available at http://www.hp.com/hpinfo/newsroom/press_kits/2011/HPAcceleratesConvergence/Adaptive_Optimization_Software.pdf (last accessed Dec. 8, 2021), Feb. 2011.

"About Dynamic Tiering", Hitachi, available at https://knowledge.hitachivantara.com/Documents/Management_Software/SVOS/8.1/Volume_Management/Tiered_Storage/1_About_Dynamic_Tiering, last accessed Dec. 8, 2021.

Dufrasne, Bert, et al., IBM DS8000 Easy Tier, International Business Machines Corporation, available at http://www.redbooks.ibm.com/abstracts/redp4667.html?Open (last accessed Dec. 8, 2021), published Nov. 2019.

"Tier on-premises data to the cloud", NetApp, available at https://docs.netapp.com/us-en/occm/concept_cloud_tiering.html (accessed Dec. 8, 2021), last updated Oct. 7, 2021.

Ochs, Rick, "Introducing the Next-Generation of Cloud Volumes Optimization by Turbonomic", Tubonomic Blog, available at https://blog.turbonomic.com/introducing-the-next-generation-of-cloud-volumes-optimization-by-turbonomic, published Jan. 15, 2021.

* cited by examiner

```
HOST SEGMENT STRUCT

'HOST1' => {
    MDISK_1 => {
        TYPE = NVME
        LOCATION = CLOUD1
        POOL = POOL1
    }
    MDISK_2 => {
        TYPE = HDD
        LOCATION = CLOUD2
        POOL = POOL1
    }
    MDISK_3 => {
        TYPE = HDD
        LOCATION = CLOUD2
        POOL = POOL1
    }
    ...
    ...
}
```

FIG. 4

GENERATING MULTI-DIMENSIONAL HOST-SPECIFIC STORAGE TIERING

BACKGROUND

The present application generally relates to information technology and, more particularly, to storage systems.

Hybrid cloud solutions combine private clouds with one or more public cloud services. A hybrid cloud solution can provide greater flexibility to users. For example, a business can keep private data on a private cloud while simultaneously leveraging computational resources of one or more public clouds. Workloads can also be moved between cloud solutions based on, for example, computational needs or costs.

SUMMARY

In one embodiment of the present disclosure, techniques for generating multi-dimensional host-specific storage tiering are provided. An exemplary computer-implemented method includes maintaining information of a plurality of storage resources connected to at least one host device; configuring, based at least in part on the information, a plurality of partitions of the storage resources, each partition comprising multiple storage tiers, wherein the plurality of partitions is configured to provide physical migration paths between the multiple storage tiers within each of the partitions; detecting a change to the plurality of storage resources; and reconfiguring the plurality of partitions based at least in part on the detected change.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

BRIEF DESCRIPTION OF THE DRAWINGS

FIG. 4 is a diagram illustrating an example of a segment map in accordance with exemplary embodiments;

DETAILED DESCRIPTION

Figure 1:
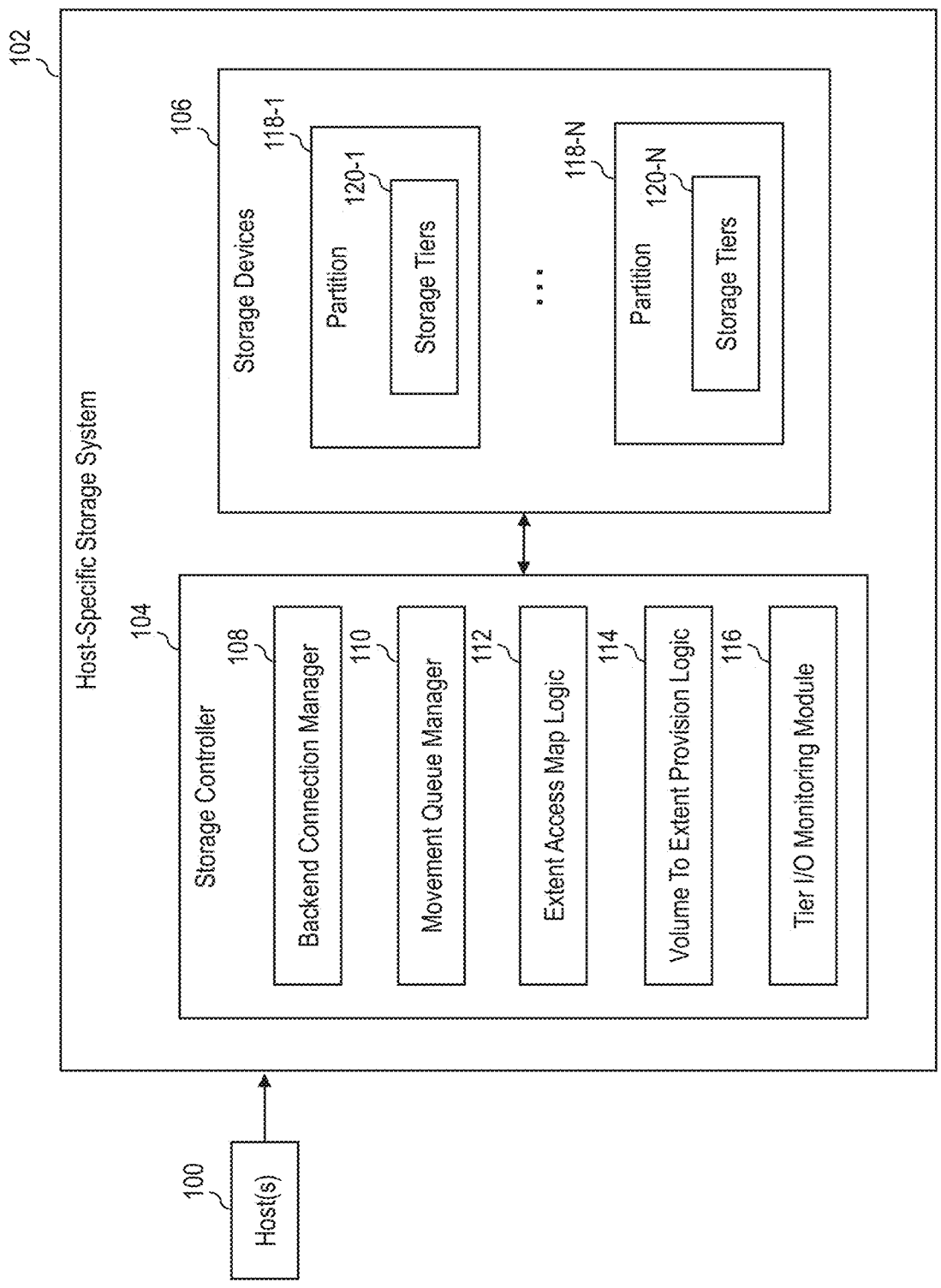
FIG. 1 is a diagram illustrating a system architecture in accordance with exemplary embodiments.

Hybrid cloud solutions are often based on multiple different storage offerings. There are multiple factors of the underlying storage offering that affect the performance of an application. For example, different types of disks and tiering methods can be used, and the disks can be located at different physical or logical sites. At least some of these factors can lead to impacts or bottlenecks in the overall performance of the cloud solutions.

When storage attached to a host is tiered, it is generally expected that the data can move across the tiers based on the needs of the application. By way of example, initially, data corresponding to the application might be hosted on a slower storage tier, and later the data might get migrated to a faster tier for increased performance. It is also expected that data can be moved between any of the tiers.

When storage connected to a host is provisioned from a hybrid cloud environment, then a part of the storage can be from a first private cloud, a second part of the storage can from a second private cloud, and a third part of the storage can be provided from a public cloud. Generally, an underlying virtualization manager manages the different types of storage spaces and provides a consolidated view to the host of the application for read and write operations.

Also, depending on the implementation, it might not be possible to migrate data directly from a private cloud to a public cloud, but migrating data between different private clouds may be allowed, possibly, even if the service providers of the private clouds are different. In such situations, application performance can be affected due to limitations experienced with extent demotion and/or promotion in the tiering migration. Moreover, in the case of extent balancing at the storage systems, if extents cannot be moved between the same tier of storage (e.g., between a first private cloud and a second private cloud), then the extents need to be demoted first (e.g., to public cloud) before they are moved to the other location (e.g., the second private cloud). This can affect the performance for all incoming application Input-Output (IO) operations.

For storage rebalancing and migration planning, it is important to have tiers be interconnected and to have at least one extent migration path available between the tiers to avoid migration interruptions. This is not possible with existing cloud-based offerings since tiering is designed for local storage disks and is not designed to be scalable with cloud implementations. Also, hosts associated with the storage system can be on-premise and/or deployed on one of the private or public clouds, which causes further challenges to existing techniques.

At least some embodiments described herein address issues with segmentation of available storage types while offering virtualized storage volumes to the host. For example, some embodiments include partitioning storage of a system such that within each partition, data can migrate from any storage location to any other storage location, and then storage tiering is applied within each partition.

One embodiment described herein can be implemented to work in conjunction with a storage system and tiering daemon operated in multi-cloud storage backend system that provides a consolidated host dependent segmentation view of the backend storage with extent movement path availability for inter/intra tier migration process. Such an embodiment can include collecting backend information using in-bound and out-bound application programming interface (API) information for each backend system connected to the storage system and accordingly identify the suitable backend tiers segment tuple for specified characteristics of a host. In such embodiments, the storage access and migration paths are determined based in part on inter-tier and intra-tier migration policies and accordingly the list of backend extents (e.g., physical level logical block addresses (LBAs)) are assigned within the logical storage pool that can be assigned to the host based on tiering usage. Additionally, in some embodiments, the host can characterize cloud access permissions, and security compliance information can be collected and mapped with the extent and the corresponding backend listing to prepare the internally segmented logical partition, which can then be allocated to the host. Also, in some embodiments, assignments based on weights can be performed to select the best available extents for volume allocation for a specific host, and accordingly the segment can be supplied to the volume creation logic of the storage system. The storage rebalancing and inter-tier migration process, in some embodiments, includes obtaining host polices by the multi-tier software daemon, and the segmentation information is collected from particular data structures (as described in more detail in conjunction with FIG. 4, for example) that provide internal partitions for the host where the data can be placed. These tuples are offered to an extent movement service of the storage system, which then updates the extent targets based at least in part on satisfaction of the constraints. Accordingly, the extents for the volumes that are connected to a restricted backend movement can obtain performance and migration benefits. Additionally, such embodiments can scale for any cloud storage with performance retention as the migration paths are defined and validated before any tiering data movement is performed. The multi-dimensional storage tiering that is generated in accordance with at least some embodiments may be specific to a single host or a plurality of hosts, such as a group of hosts.

FIG. 1 is a diagram illustrating a system architecture in accordance with exemplary embodiments. By way of illustration, FIG. 1 depicts one or more host devices 100 and a host-specific storage system 102. The host-specific storage system 102 includes at least one storage controller 104 and one or more storage devices 106. In the FIG. 1 example, the storage controller 104 comprises a backend connection manager 108, a movement queue manager 110, extent access map logic 112, volume to extent provision logic 114, and tier IO monitoring module 116. Each of components 108, 110, 112, 114, and 116 is discussed in more detail elsewhere herein.

Generally, the host-specific storage system 102 stores data on the storage devices 106 associated with one or more applications executing on the host devices 100 based on input and/or output operations (such as read/write operations) associated with the applications.

The storage devices 106 may be located across multiple logical or physical sites and/or may correspond to multiple different clouds (e.g., one or more public clouds or one or more private clouds). In the FIG. 1 example, it is assumed the storage devices 106 are associated with multiple partitions 118-1, . . . , partition 118-N (collectively partitions 118), and each partition is associated with one or more storage tiers 120-1, . . . , 120-N. It is assumed that each of the storage tiers corresponding to a given one of the partitions 118 provides a different level of performance. The storage devices 106 may include hard disk drives (HDD), solid state drives (SDD), nonvolatile memory express (NVMe), tape drives and/or other types of suitable storage devices.

In some embodiments, the storage (e.g., corresponding to storage devices 106) connected to a host server can be provisioned from multiple cloud storage vendors, where the storage clouds can include on or more private clouds or one or more public clouds. In some embodiments, pairs of clouds between which migration is possible and, possibly, pairs of clouds between which migration is not feasible, are identified (e.g., by the backend connection manager 108). Migration costs and overhead between any pair of clouds can be provided (e.g., by the tier I/O monitoring module in 116) in advance to factor in the process of storage segmentation. Operational policies of cloud storage providers, host servers (e.g., host devices 100), and applications utilizing the cloud storage can be considered to determine different storage partitions and tier segments within each partition.

For example, the process for dynamically reconfiguring the multi-dimensional host dependent storage tiering can be performed at least in part using movement queue manager 110, extent access map logic 112, and volume to extent provision logic 114. Re-configuring the multi-dimensional host specific storage tiering ensures that a new configuration state can be selected that is better (or less destructive) than the existing state. It is noted that multiple re-configuration options from the current multi-dimensional storage tiering state may be possible, and, in some embodiments, only the feasible re-configuration options based on application/host parameters are presented to the host server. In some embodiments, the application (or the host executing the application) selects the final re-configuration option to be used.

Some factors for determining the reconfiguration options include reliability, cost, and/or migration overhead. For example, different storage clouds connected to a host might be homogeneous or heterogeneous environments. In a homogenous environment, it may be possible to migrate among multiple clouds, whereas migration may not be possible among multiple clouds in a heterogeneous environment. Cost and migration overhead can be important (possibly, critical) criteria for assigning a cloud to an appropriate category in a multi-dimensional storage tiering setting depending on the cost and/or migration overhead of the migration between storage of two clouds. Thus, in some embodiments, storage from clouds can be split into different dimensions/segments of storage tiers depending on such factors.

Figure 2:
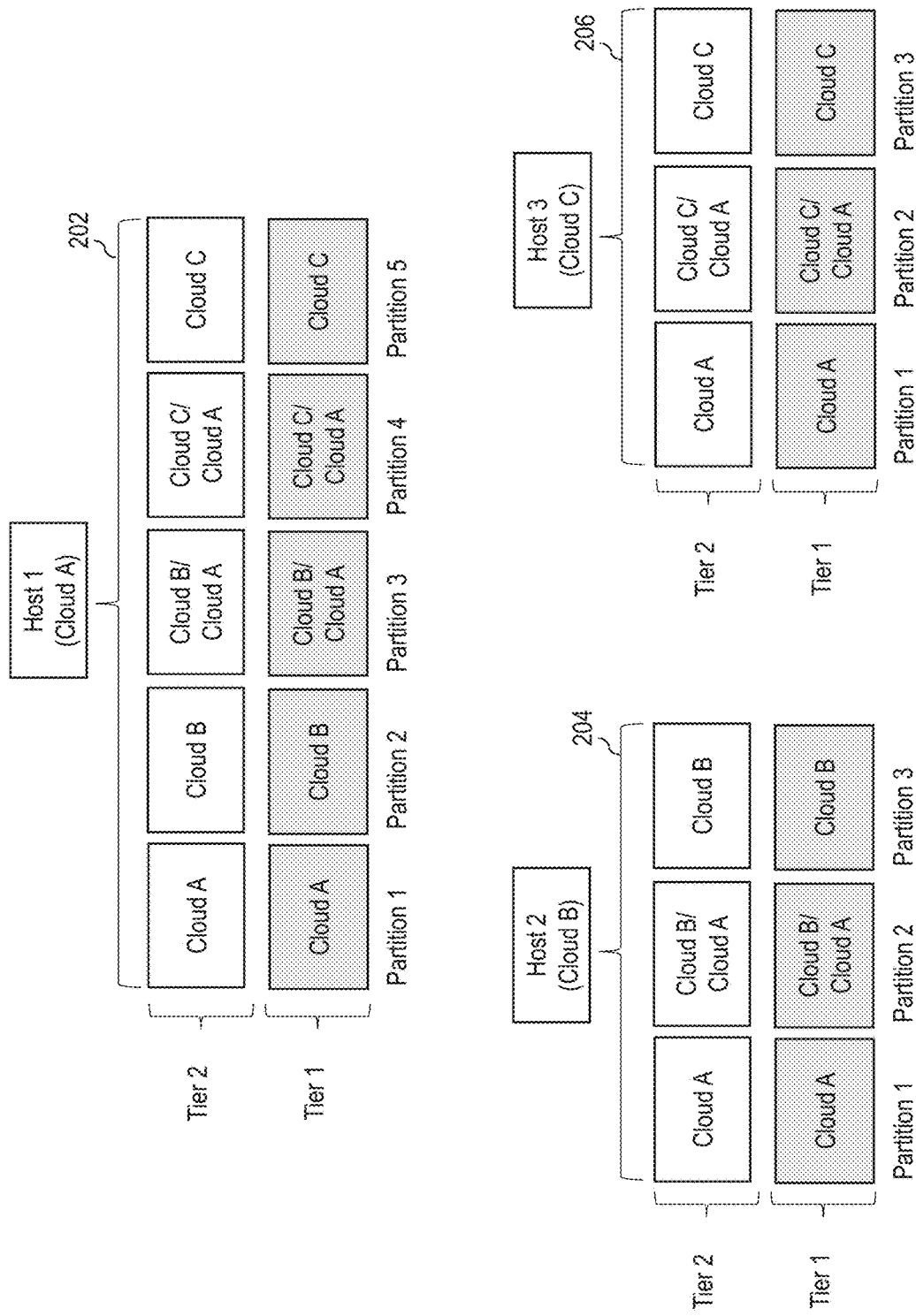
FIG. 2 is a diagram illustrating an example of host-specific storage partitions and tiering segments within each partition, in accordance with exemplary embodiments.

Consider an example where storage is provided from clouds A, B, and C. At least one embodiment includes generating policies and tiering segments for different hosts. FIG. 2 shows a diagram illustrating an example of host-specific policies 202, 204, 206 for three different hosts (i.e., hosts 1, 2, and 3) with respect to clouds A, B, and C. In the FIG. 2 example, it is assumed the storage is across two tiers, namely, tier 1 and tier 2. In this example, the storage for host 1 is split into partitions 1-5, and for each partition the policy 202 specifies which of the clouds A, B, and C can be used by each partition. The storage corresponding to host 2 and host 3 is each split into three partitions. The policy 204 indicates host 2 can access only clouds A and B, and the policy 206 indicates host 3 can access only clouds A and C.

Figure 3:
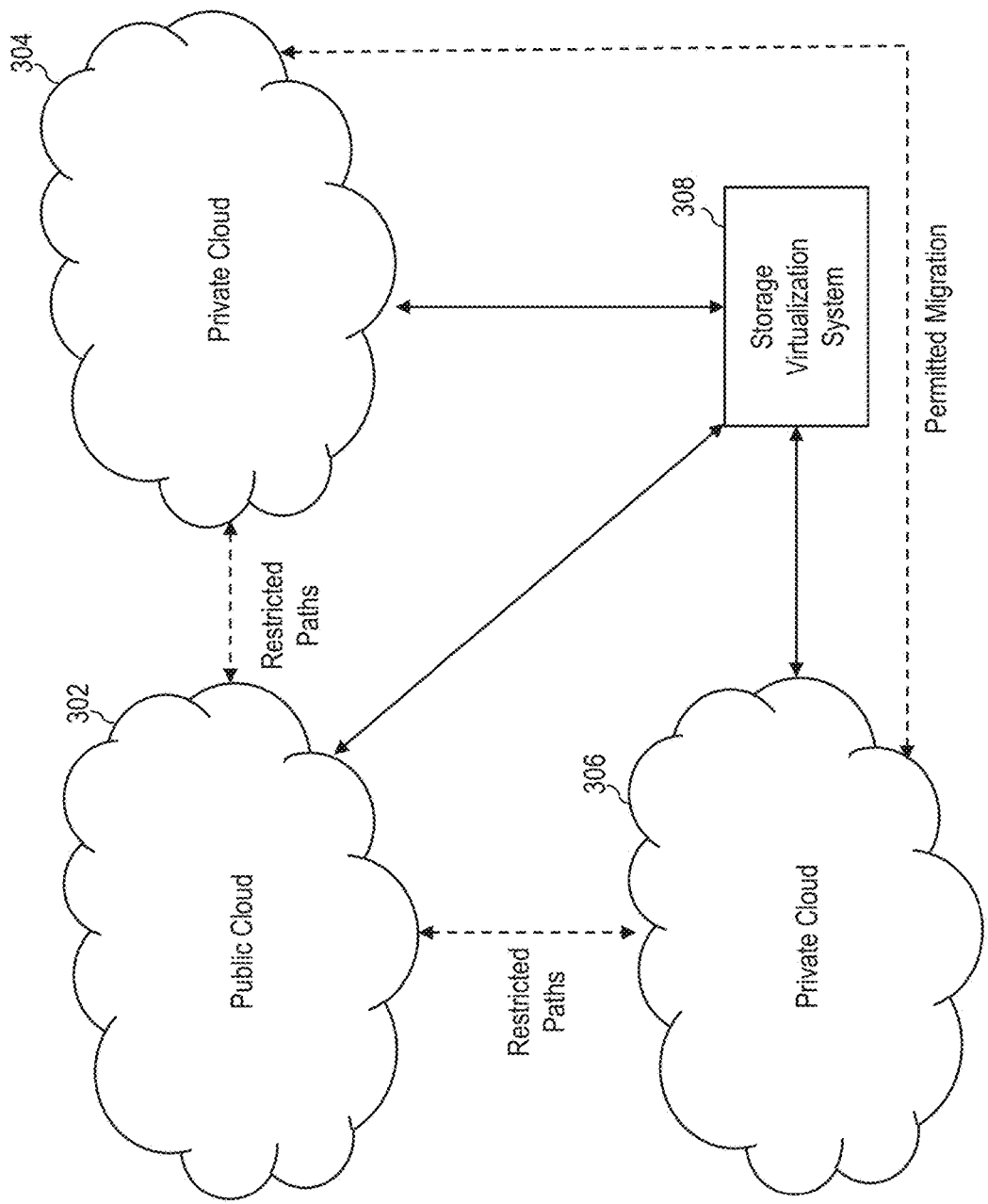
FIG. 3 is a diagram illustrating an example of restricted migration paths in accordance with exemplary embodiments.

FIG. 3 is a diagram illustrating an example of restricted migration paths in accordance with exemplary embodiments. FIG. 3 depicts a public cloud 302, two private clouds 304 and 306, and a storage virtualization system 308 (which in some embodiments corresponds to at least a portion of the host-specific storage system 102). In this example, migrations are not permitted between (i) the public cloud 302 and private cloud 304 and (ii) the public cloud 302 and private cloud 306; but migrations are permitted between the private clouds 304 and 306. Thus, some embodiments include tracking which migration subsets are permitted. In this example, a first migration subset includes the storage devices corresponding to the public cloud 302 and the private cloud 304, and a second migration subset includes the storage devices corresponding to the public cloud 302 and the private cloud 306.

FIG. 4 is a diagram illustrating an example of a segment map in accordance with exemplary embodiments. In this example, the segment map is in the form of a host segment struct 400 for a given host (i.e., host 1). Each segment represents a partition of the storage from which extents can be selected for volume allocation for the host. Accordingly, the host segment struct 400 represents the configuration of the storage connected to the host, which can be detected by the host using software drivers, for example. The host segment struct 400 maintains information for a set of storage devices corresponding to host 1. In this example, for each storage device, the host segment struct 400 includes a type, a location, and the pool of the storage device.

Figure 5:
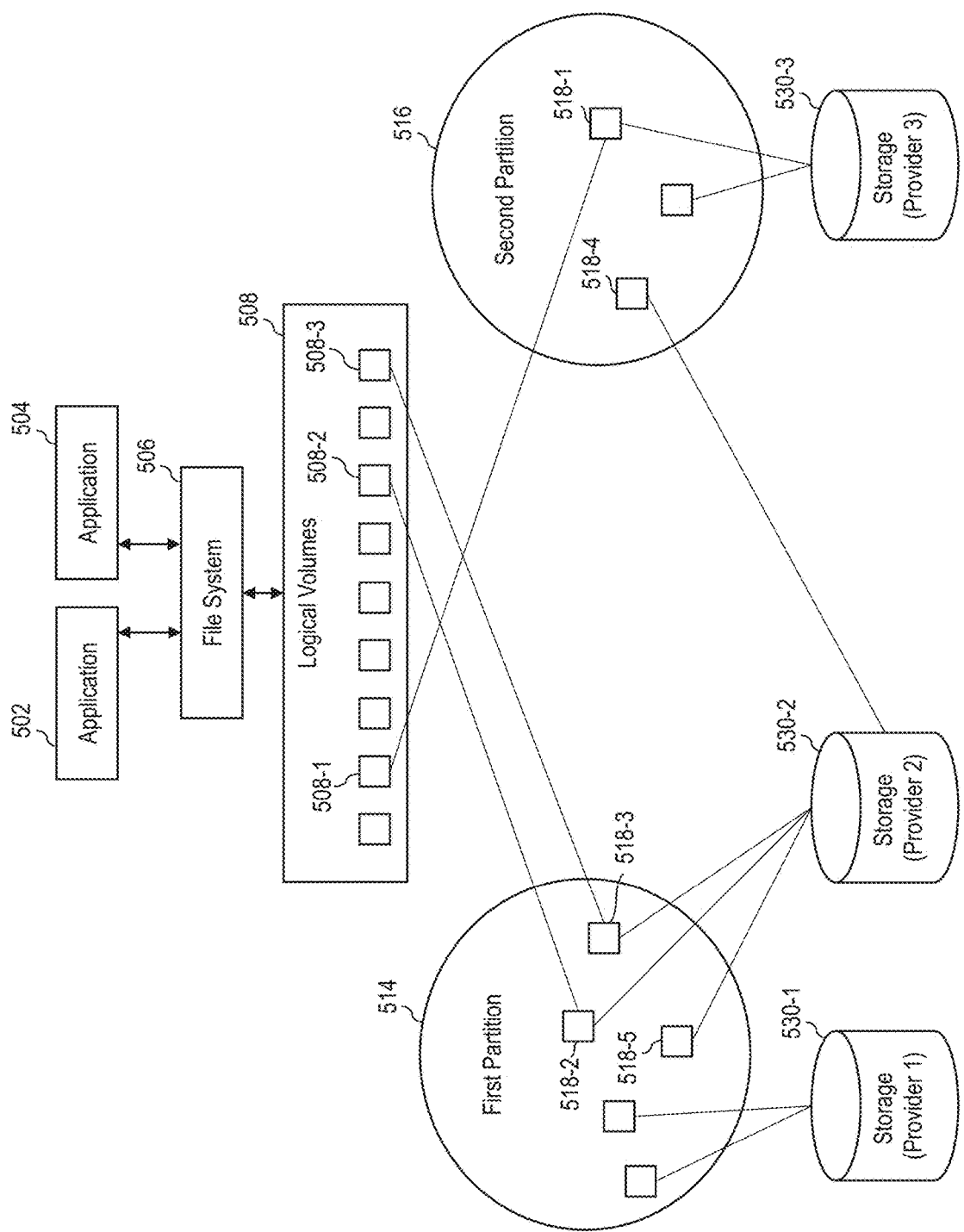
FIG. 5 is a diagram illustrating an example showing mappings between logical volumes and physical volumes of a storage system in accordance with exemplary embodiments.

FIG. 5 is a diagram illustrating an example showing mappings between logical volumes and physical volumes of a storage system in accordance with exemplary embodiments. Specifically, FIG. 5 depicts applications 502 and 504, each of which interact with a file system 506 associated with a plurality of logical volumes 508. It is assumed that logical volume 508-1 corresponds to data associated with application 502, and logical volumes 508-2 and 508-3 correspond to data associated with application 504. Some embodiments described herein include managing mappings between the logical volumes 508 and different storage partitions. FIG. 5 depicts two storage partitions 514 and 516, each including a set of physical volumes (represented as squares), where logical volume 508-1 is initially mapped to physical volume 518-1 in the second partition 516, and logical volumes 508-2 and 508-3 are respectively mapped to the physical volumes 518-2 and 518-3 in the first partition 514. FIG. 5 also shows mappings between the partitions 514 and 516 and data storage 530-1, 530-2, and 530-3, which are assumed to be provided by different storage providers (providers 1, 2, and 3). For example, physical volumes 518-2 and 518-3 are mapped to storage 530-2, and physical volume 518-1 is mapped to storage 530-3. It is also noted that physical volume 518-4 from the second partition 516 is mapped to the storage 530-2, and physical volume 518-5 from the first partition 514 is mapped to the storage 530-2. It is assumed that other mappings (and possibly other applications) exist, but are omitted for clarity (e.g., between logical volumes 508, partitions 514 and 516, and storage 530-1, 530-2, and 530-3).

Figure 6:
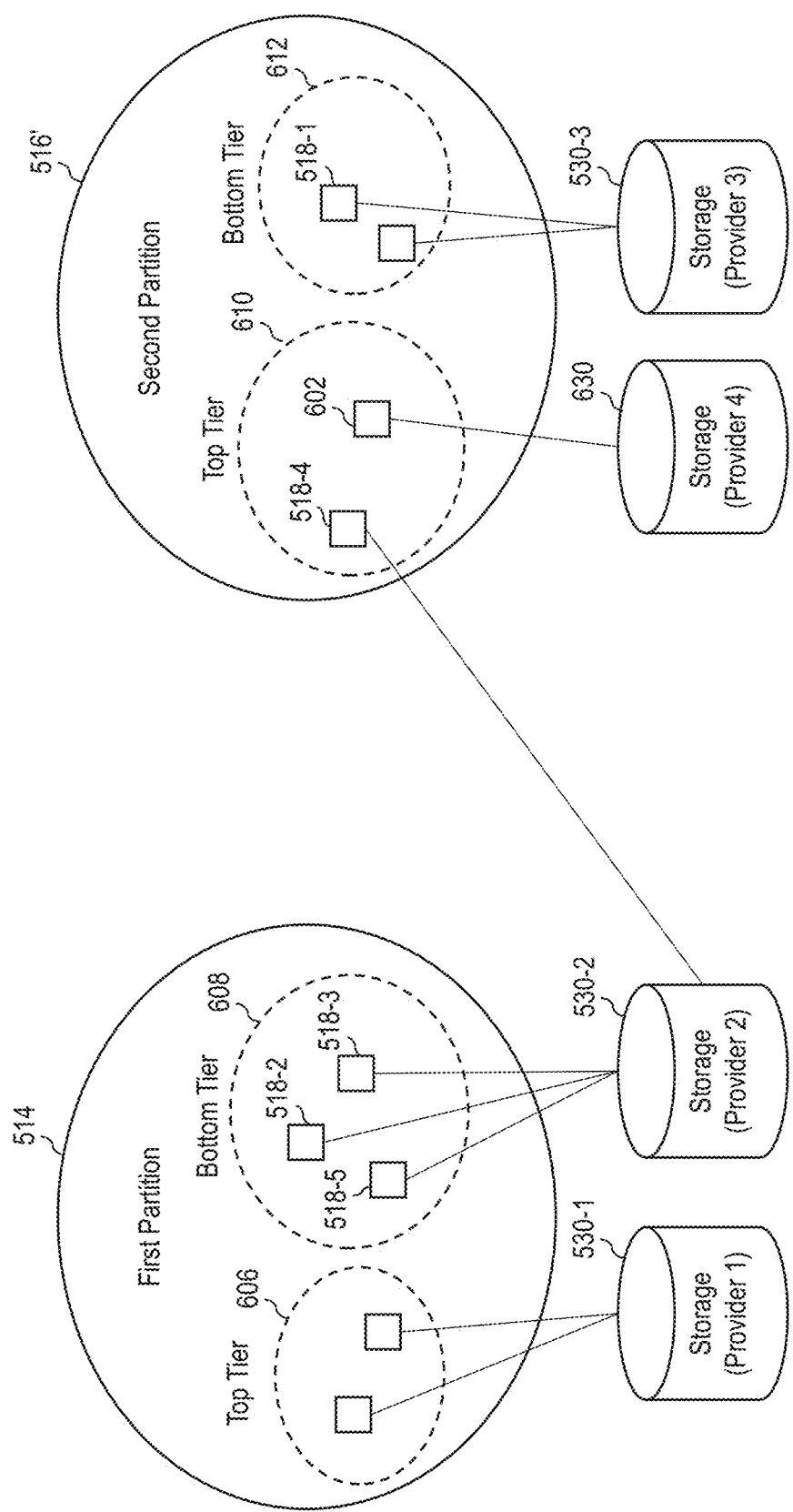
FIG. 6 is a diagram illustrating an example of mappings that are updated in response to adding additional storage in accordance with exemplary embodiments.

FIG. 6 is a diagram illustrating an example where the mappings from FIG. 5 are updated in response to adding additional storage in accordance with exemplary embodiments. Specifically, storage 630 from a fourth storage provider (provider 4) is added to the system. Assume storage 630 is not compatible with storage 530-1, and so the available re-configuration options for adding storage 630 include: (i) adding storage 630 into the second partition 516 or (ii) adding storage 630 to the first partition 514 and moving storage 530-1 from the first partition 514 to the second partition 516. Option (i) is selected in this example because no changes are required to the configuration of the first partition 514. Accordingly, FIG. 6 shows an updated configuration 516' of the second partition that includes a new physical volume 602 that is stored on storage 630. FIG. 6 also shows different tiers of storage for the first partition 514 (top tier 606 and bottom tier 608) and second partition 516' (top tier 610 and bottom tier 612).

Figure 7:
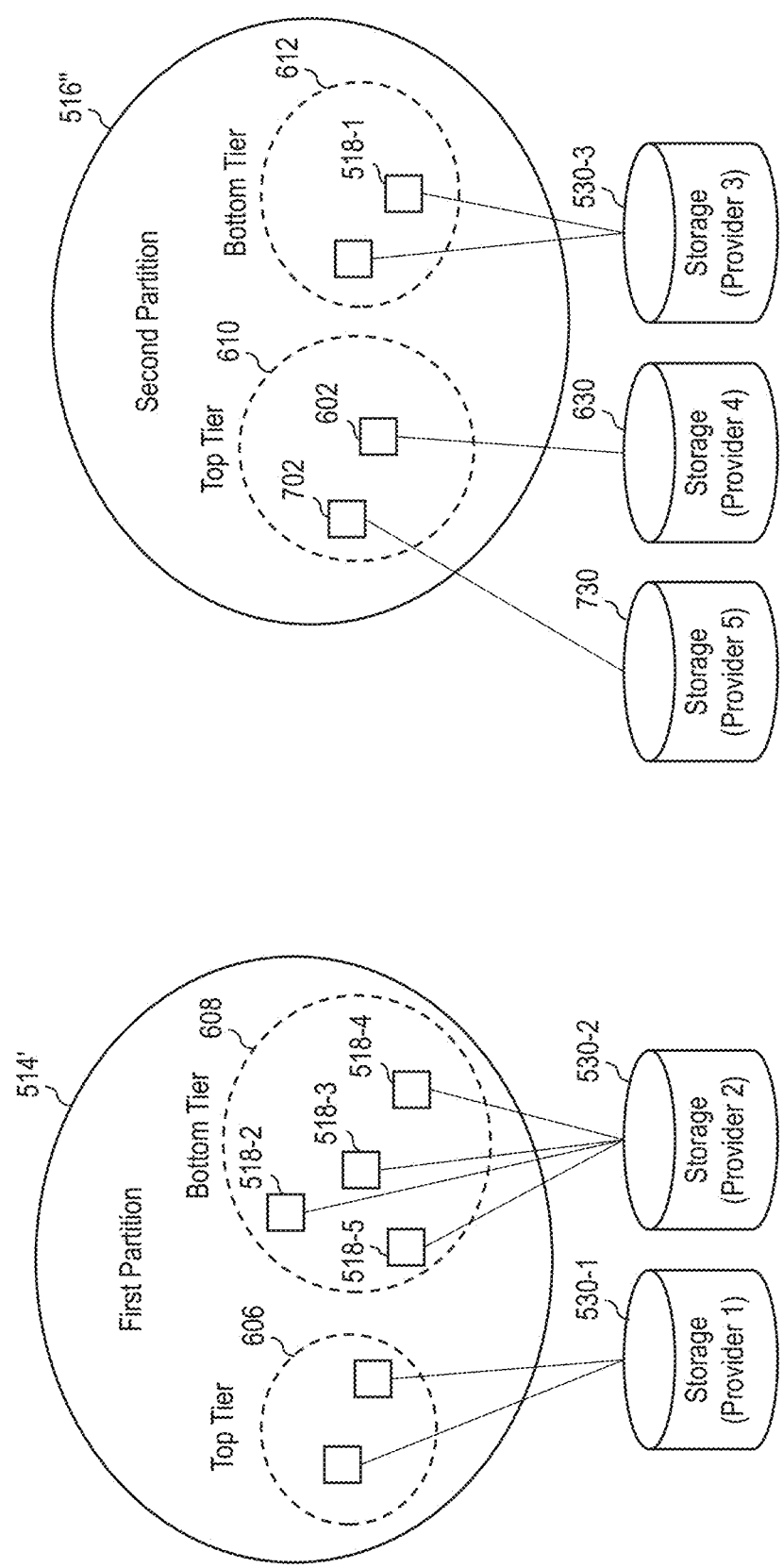
FIG. 7 is a diagram illustrating another example of mappings that are updated in response to adding additional storage in accordance with exemplary embodiments.

FIG. 7 is a diagram illustrating another example of mappings that are updated in response to adding additional storage in accordance with exemplary embodiments. In FIG. 7, storage 730 corresponding to fifth storage provider (provider 5) is added to the system. It is assumed that storage 630 is not compatible with storage 530-2, and so the available re-configuration options for adding storage 730 include: (i) adding storage 730 to the first partition 514 and moving physical volumes 518-2, 518-3, and 518-5 of storage 530-2 from the first partition 514 to the second partition 516' or (ii) adding storage 730 to the second partition 516' and moving physical volume 518-4 of storage 530-2 from the second partition 516' to the first partition 514. Option (ii) is selected in the FIG. 7 example since it requires less changes from the current configuration (option (i) requires moving three physical volumes 518-2, 518-3, and 518-5, whereas option (ii) requires moving only physical volume 518-4). Accordingly, FIG. 7 shows an updated configuration of the second partition 516'', which includes a new physical volume 702 added to the top tier 610 of the storage 730. Also, an updated configuration of the first partition 514' includes the physical volume 518-4 that was moved from the second partition 516.

Additionally, one or more embodiments can also provide host-specific (or application-specific) security compliance and cloud access permission during extent allocation. For example, a first application can specify that its data should not be allocated to physical storage from one or more cloud storage services, and this information can be passed to the underlying storage tiering software in-band as part of the metadata residing in the private disk region of the logical volumes by the storage management layer, for example, using one or more input/output control (IOCTL) commands.

Figure 8:
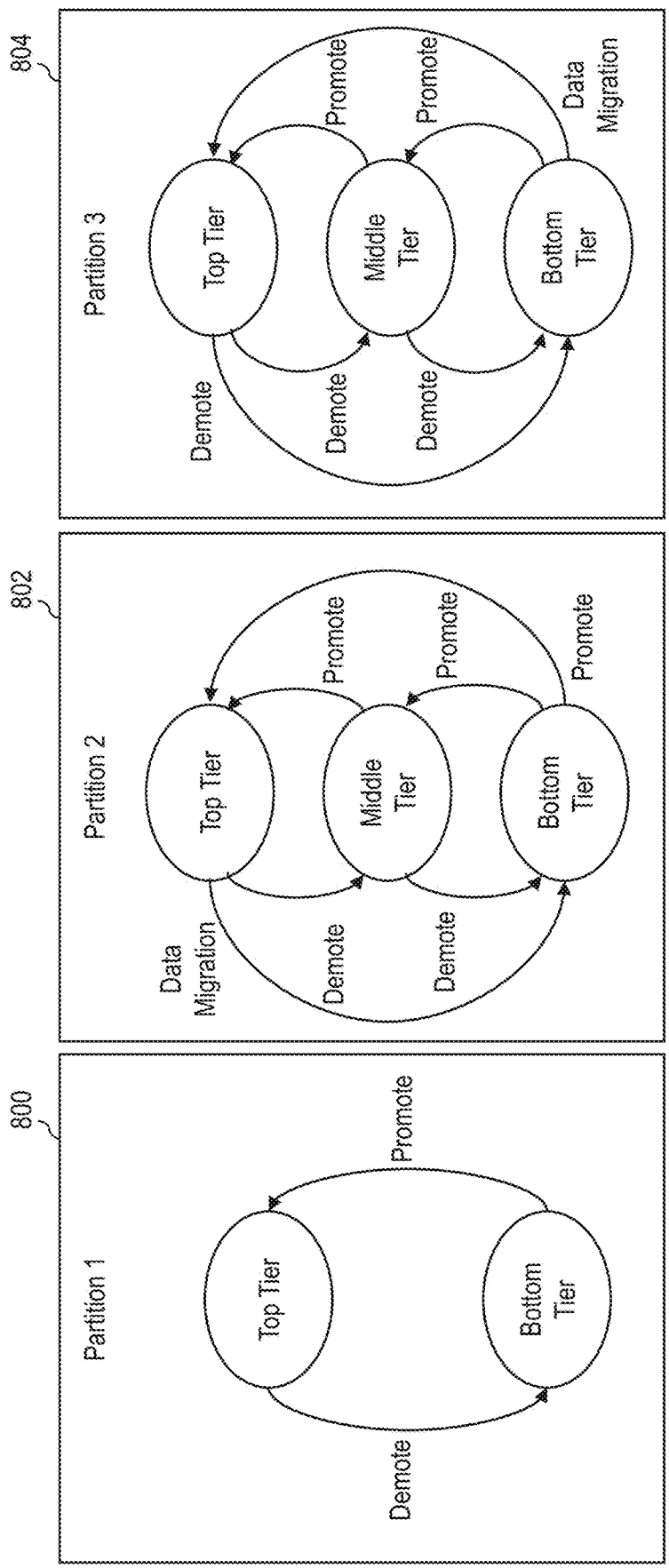
FIG. 8 is a diagram illustrating an example of data migration across storage tiers within different storage partitions in accordance with exemplary embodiments.

FIG. 8 is a diagram illustrating an example of data migration across storage tiers within different storage partitions in accordance with exemplary embodiments. FIG. 8 depicts management schemes for three partitions 800, 802, and 804. Each of the partitions 800, 802, and 804 includes a bottom tier and a top tier; partitions 802 and 804 also include a middle tier. The corresponding management schemes are specific to each of the partitions 800, 802, and 804 as depicted in FIG. 8.

At least some of the embodiments described herein allow the number of partitions to be continuously changed, for example, due to re-configurations from the addition/removal of physical storage, and due to the policy changes from storage providers as well as the application owners. Also, a physical storage extent can be part of different storage partitions at different points in time, and the management of storage tiers inside a storage partition is independent to the other partitions (e.g., different partitions can have different tiers of storage).

By way of example, some embodiments described herein can facilitate organization of block storage attached to a host either directly or via a storage area network. Consider a data retention policy is associated with application data, and that different applications have different data retention policy requirements. In this situation, there can be substantial cost and space overhead for organizations, unless it is clear what type of storage should be used to store the retained data. If data is past the active access period, but still within the retention period, then the data can be placed in a lower storage tier to minimize cost. Also, in some embodiments, multiple storage partitions can be created to provide storage to applications with similar data retention policies. For example, application data associated with a long-term data retention policy requirement can be allocated from a first partition, and application data with a short-term data retention policy requirement can be allocated to a second partition. Data deletion policies can be associated with the archival storage within each storage partition to automatically delete data after the retention policy expiration to optimize the storage space and associated costs. According to some embodiments, data of each storage partition, can initially reside in a top storage tier of the respective storage partition, and as the data becomes less frequently accessed, the data can be moved to a lower storage tier of the respective storage partitions.

As another example, some embodiments can predict application storage needs and allocate storage from the appropriate storage partition and the tier within that partition. For example, the allocation of the storage for an application by the storage tiering software can be reactive, for example, based on the frequency of access and recency of access of data by the application. It is also possible to predict the storage requirement for an application proactively before the data is actually accessed by the application. Such a prediction can improve the efficiency of selecting a suitable storage partition and a tier within the selected storage partition as it helps avoid unnecessary data migration between storage tiers within or across storage partitions.

Figure 9:
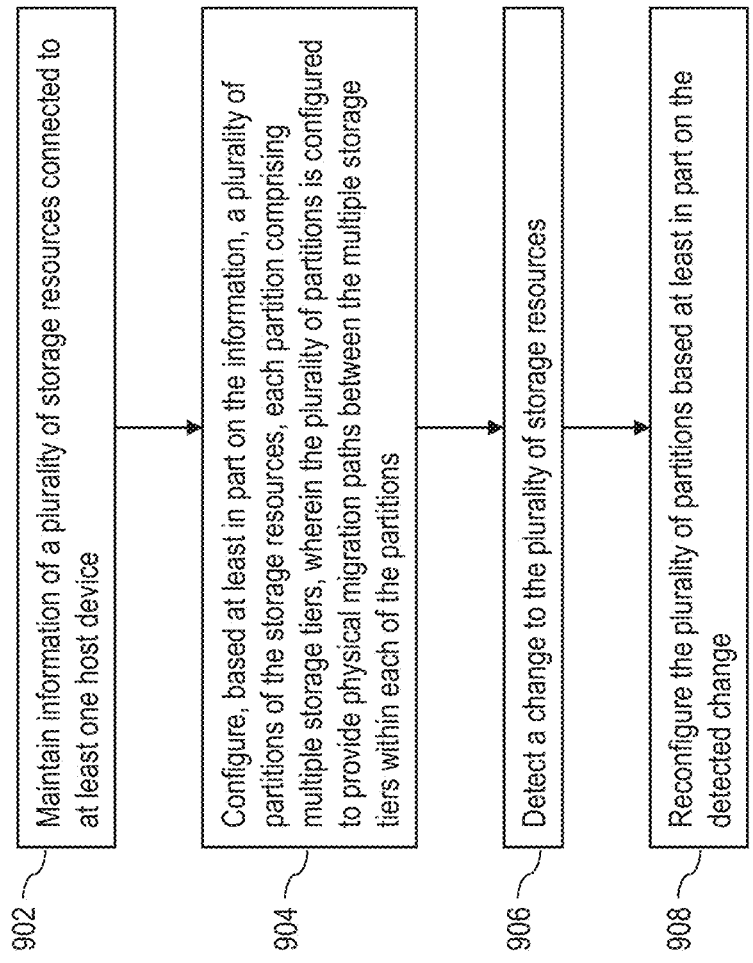
FIG. 9 is a flow diagram illustrating techniques for generating multi-dimensional host-specific storage tiering in accordance with exemplary embodiments.

FIG. 9 is a flow diagram illustrating techniques in accordance with exemplary embodiments. Step 902 includes maintaining information of a plurality of storage resources connected to at least one host device. Step 904 includes configuring, based at least in part on the information, a plurality of partitions of the storage resources, each partition comprising multiple storage tiers, wherein the plurality of partitions is configured to provide physical migration paths between the multiple storage tiers within each of the partitions. Step 906 detecting a change to the plurality of storage resources. Step 908 includes reconfiguring the plurality of partitions based at least in part on the detected change.

A first portion of the storage resources may be provided at least in part by one or more private cloud storage services, and a second portion of the storage resources may be provided at least in part by one or more public cloud storage services. The change may include adding one or more new storage resources to the plurality of storage resources. The reconfiguring may include selecting one of the partitions to which the one or more new storage resources can be added without affecting the other partitions; and adding the one or more new storage resources to the selected partition. The reconfiguring may include determining that the one or more new storage resources cannot be added to any of the plurality of partitions without affecting the other partitions; and reconfiguring the plurality of partitions to include the one or more new storage resources while minimizing a number of changes relative to the existing configuration. The reconfiguring may include at least one of: adjusting a number of the plurality of partitions based at least in part on the detected change; moving at least one physical storage resource from a first one of the plurality of partitions to a second one of the plurality of partitions; deleting one or more of the plurality of partitions; and adding one or more new partitions to the plurality of partitions. The change may include at least one of: removing one or more storage resources from the plurality of storage resources; an operation change associated with at least a portion of the plurality of storage resources; deleting one or more of the plurality of partitions; and adding one or more new partitions to the plurality of partitions. The information may include one or more constraints on availability of one or more physical migration paths between one or more pairs of the plurality of storage resources. The information may indicate at least one of: one or more locations associated with at least a portion of the plurality of storage resources; and one or more storage types for at least a portion of the plurality of storage resources. The process may include configuring the multiple storage tiers within a given one of the plurality of partitions based on at least one of: (i) one or more constraints associated with one or more storage providers of the plurality of storage resources; (ii) one or more performance metrics associated with the plurality of storage resources; and (iii) one or more cost metrics associated with the plurality of storage resources. The plurality of partitions may be further configured to provide physical migration paths between the plurality of partitions.

The techniques depicted in FIG. 9 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 9 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 10:
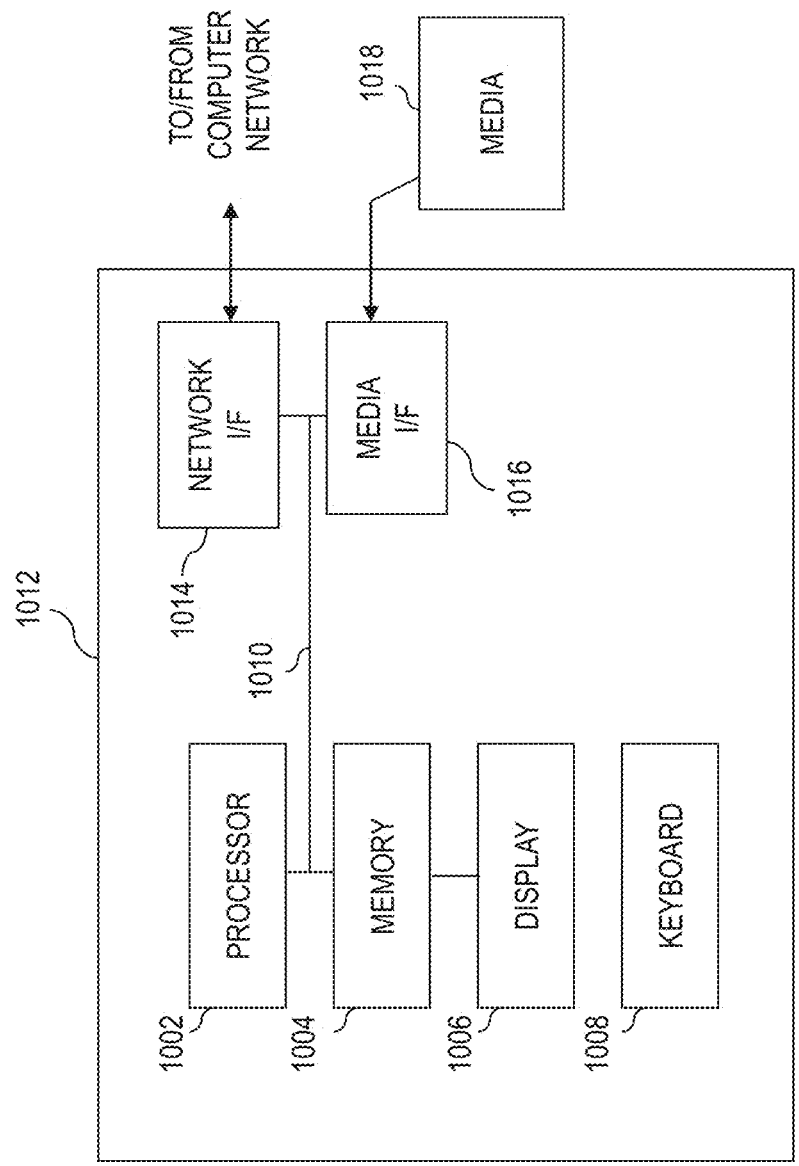
FIG. 10 is a system diagram of an exemplary computer system on which at least one embodiment of the present disclosure can be implemented.

Additionally, an embodiment of the present disclosure can make use of software running on a computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1002. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
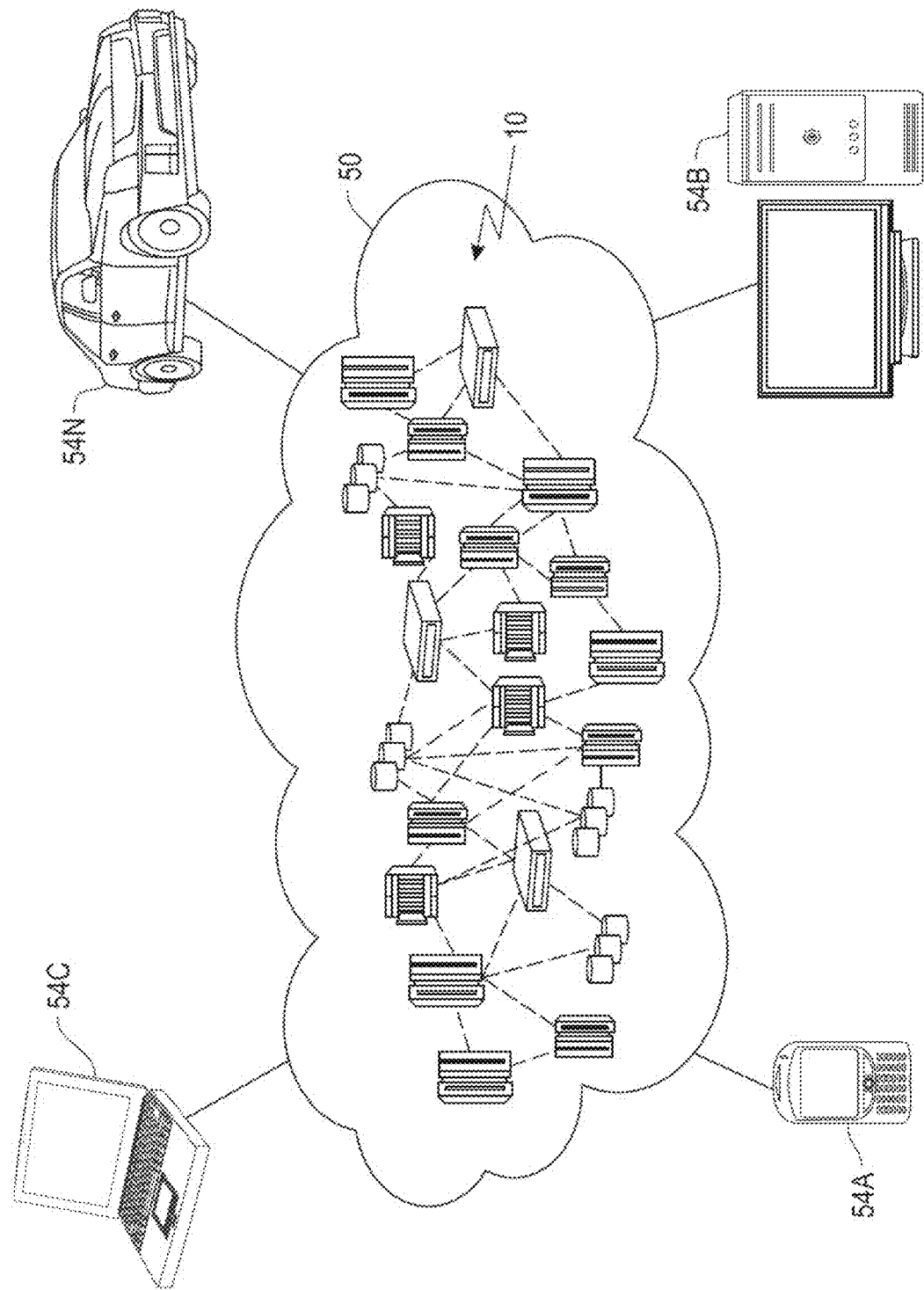
FIG. 11 depicts a cloud computing environment in accordance with exemplary embodiments.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
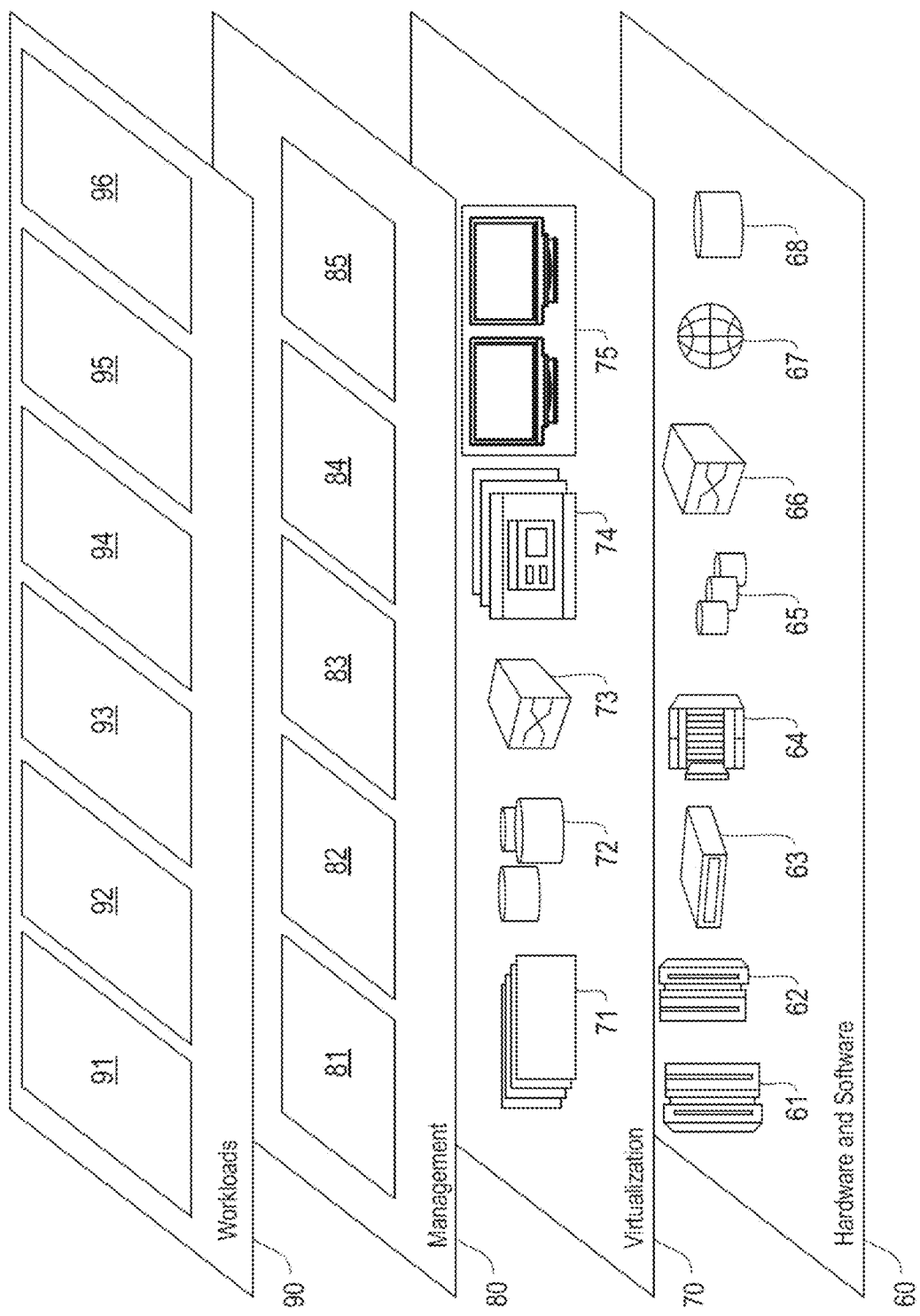
FIG. 12 depicts abstraction model layers in accordance with exemplary embodiments.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-dimensional host-specific storage tiering 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, accelerate application migration to a cloud native ecosystem by at least tiering the storage connected to the target cloud to help allocate the appropriate storage tier for the application.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    maintaining information of a plurality of storage resources connected to at least one host device and provided by a plurality of distinct cloud storage services;
    configuring, based at least in part on the information, a plurality of partitions of the storage resources, each partition comprising multiple storage tiers, wherein the plurality of partitions is configured to provide physical migration paths between the multiple storage tiers within each of the partitions, and wherein at least one of the partitions is configured over at least two of the distinct cloud storage services;
    detecting a change to the plurality of storage resources; and
    reconfiguring the plurality of partitions based at least in part on the detected change;
    wherein the method is carried out by at least one computing device.

2. The computer-implemented method of claim 1, wherein a first portion of the storage resources is provided by at least one private cloud storage service of the plurality of distinct cloud storage services, and wherein a second portion of the storage resources is provided by at least one public cloud storage service of the plurality of distinct cloud storage services.

3. The computer-implemented method of claim 1, wherein the change comprises adding one or more new storage resources to the plurality of storage resources.

4. The computer-implemented method of claim 3, wherein the reconfiguring comprises:
    selecting one of the partitions to which the one or more new storage resources can be added without affecting the other partitions; and
    adding the one or more new storage resources to the selected partition.

5. The computer-implemented method of claim 3, wherein the reconfiguring comprises:
    determining that the one or more new storage resources cannot be added to any of the plurality of partitions without affecting the other partitions; and
    reconfiguring the plurality of partitions to include the one or more new storage resources while minimizing a number of changes relative to the existing configuration.

6. The computer-implemented method of claim 1, wherein the reconfiguring comprises at least one of:
    adjusting a number of the plurality of partitions based at least in part on the detected change;
    moving at least one physical storage resource from a first one of the plurality of partitions to a second one of the plurality of partitions;
    deleting one or more of the plurality of partitions; and
    adding one or more new partitions to the plurality of partitions.

7. The computer-implemented method of claim 1, wherein the change comprises at least one of:
    removing one or more storage resources from the plurality of storage resources;
    an operation change associated with at least a portion of the plurality of storage resources;
    deleting one or more of the plurality of partitions; and
    adding one or more new partitions to the plurality of partitions.

8. The computer-implemented method of claim 1, wherein the information comprises one or more constraints on availability of one or more physical migration paths between one or more pairs of the plurality of storage resources.

9. The computer-implemented method of claim 1, wherein the information indicates at least one of:
    one or more locations associated with at least a portion of the plurality of storage resources; and
    one or more storage types for at least a portion of the plurality of storage resources.

10. The computer-implemented method of claim 1, comprising:
    configuring the multiple storage tiers within a given one of the plurality of partitions based on at least one of:
        one or more constraints associated with one or more storage providers of the plurality of storage resources;
        one or more performance metrics associated with the plurality of storage resources; and one or more cost metrics associated with the plurality of storage resources.

11. The computer-implemented method of claim 1, wherein the plurality of partitions is further configured to provide physical migration paths between the plurality of partitions.

12. The computer-implemented method of claim 1, wherein software is provided as a service in a cloud environment.

13. A computer program product comprising a computer readable storage medium having program instructions embodied therewith, the program instructions executable by a computing device to cause the computing device to:
    maintain information of a plurality of storage resources connected to at least one host device and provided by a plurality of distinct cloud storage services;
    configure, based at least in part on the information, a plurality of partitions of the storage resources, each partition comprising multiple storage tiers, wherein the plurality of partitions is configured to provide physical migration paths between the multiple storage tiers within each of the partitions, and wherein at least one of the partitions is configured over at least two of the distinct cloud storage services;
    detect a change to the plurality of storage resources; and
    reconfigure the plurality of partitions based at least in part on the detected change.

14. The computer program product of claim 13, wherein a first portion of the storage resources is by at least one private cloud storage service of the plurality of distinct cloud storage services, and wherein a second portion of the storage resources is provided at by at least one public cloud storage service of the plurality of distinct cloud storage services.

15. The computer program product of claim 13, wherein the change comprises adding one or more new storage resources to the plurality of storage resources.

16. The computer program product of claim 15, wherein the reconfiguring comprises:
selecting one of the partitions to which the one or more new storage resources can be added without affecting the other partitions; and
adding the one or more new storage resources to the selected partition.

17. The computer program product of claim 15, wherein the reconfiguring comprises:
determining that the one or more new storage resources cannot be added to any of the plurality of partitions without affecting the other partitions; and
reconfiguring the plurality of partitions to include the one or more new storage resources while minimizing a number of changes relative to the existing configuration.

18. The computer program product of claim 13, wherein the reconfiguring comprises at least one of:
adjusting a number of the plurality of partitions based at least in part on the detected change;
moving at least one physical storage resource from a first one of the plurality of partitions to a second one of the plurality of partitions;
deleting one or more of the plurality of partitions; and
adding one or more new partitions to the plurality of partitions.

19. The computer program product of claim 13, wherein the change comprises at least one of:
removing one or more storage resources from the plurality of storage resources;
an operation change associated with at least a portion of the plurality of storage resources;
deleting one or more of the plurality of partitions; and
adding one or more new partitions to the plurality of partitions.

20. A system comprising:
a memory configured to store program instructions;
a processor operatively coupled to the memory to execute the program instructions to:
maintain information of a plurality of storage resources connected to at least one host device and provided by a plurality of distinct cloud storage services;
configure, based at least in part on the information, a plurality of partitions of the storage resources, each partition comprising multiple storage tiers, wherein the plurality of partitions is configured to provide physical migration paths between the multiple storage tiers within each of the partitions, and wherein at least one of the partitions is configured over at least two of the distinct cloud storage services;
detect a change to the plurality of storage resources; and
reconfigure the plurality of partitions based at least in part on the detected change.

* * * * *